United States Patent Office 3,036,057
Patented May 22, 1962

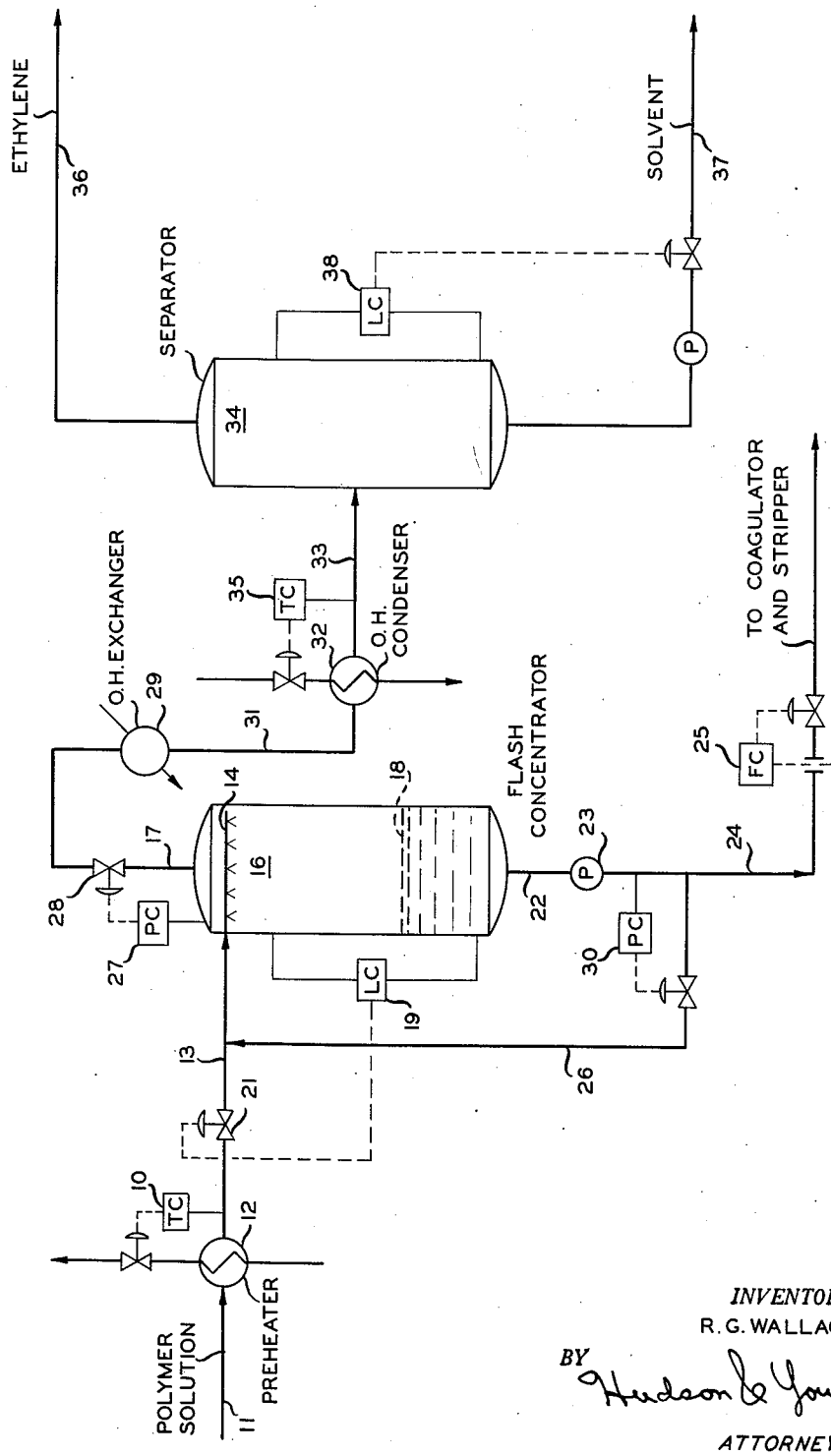

3,036,057
FLASH CONCENTRATION OF SOLUTIONS CONTAINING POLYOLEFINS
Robert G. Wallace, Grangemouth, Stirlingshire, Scotland, assignor to Phillips Petroleum Company, a corporation of Delaware
Filed Aug. 12, 1959, Ser. No. 833,195
5 Claims. (Cl. 260—94.9)

This invention relates to an improved method of flash concentrating a solution of a normally solid polyolefin solute in a hydrocarbon solvent. In one aspect it relates to an improved method of flash concentration of polyethylene in cyclohexane, by recycling most of the solution coming out of the bottom of the concentrator and combining the recycled solution with the feed stream which is to be sprayed onto the surface of the liquid in the concentrator.

In the several methods of polymerizing aliphatic olefins to solid polymers having high molecular weight, polyethylene for example, hydrocarbon solvents, such as cyclohexane, are used to facilitate the polymerization reaction and in the subsequent transfer and separation steps, as taught, for example, by Hogan et al. 2,825,721, patented March 4, 1958. Several methods of polymer-solvent separation have been developed which include flashing some solvent, for example, in flash evaporation tank 33 of Seebold 2,475,643, patented July 12, 1949, to reach a desired polymer concentration in the solvent before separating polymer and solvent by further steps. This invention may be applied to the concentration adjustment zone 13 of Wallace application Serial No. 712,908, filed February 3, 1958. It is also desirable to flash concentrate such a polymer solution in the manner of this invention to provide a solution of a predetermined concentration that can be water coagulated to produce particles of polymer that will be easy to steam strip and dry. Moreover, it is more economical in cost of equipment, power costs, and ease of control of operations, to separate solvent by flash concentration than by steam stripping.

In the prior art, chronic operating difficulties have been encountered in flash concentration. These difficulties are caused by violent flashing which results from the excessive temperature and pressure drop that normally occurs in the concentrator when the solution from the preheater is fed directly into the concentrator and flashed. This has, in turn, resulted in foaming of the liquid in the concentrator, and entrainment of polymer solution with the flashed solvent vapors into the overhead lines leading to the solvent condensers. Consequently, the impingement baffle or internal surfaces of the standard heat exchangers which serve as solvent vapor cooler and condenser, become clogged with precipitated solids as the entrained solution of polymers strikes the relatively cold components of these exchangers. The result has been plugging of the heat exchanger and condenser inlets in about 3 to 24 hours of continuous operation, putting the flash concentrator out of operation until the heat exchanger and condenser are cleaned out which is a difficult, time consuming task.

In an effort to alleviate these foaming and plugging difficulties, recycling of liquid from the bottom of a flash concentrator back into the concentrator at a point independent and below that place where the feed to be flashed enters was tried. This arrangement has not worked out satisfactorily in polyolefin-hydrocarbon solvent systems, as the exchanger and condenser inlets continued to plug.

I have discovered an improved method of flash concentration comprising the step of recycling most of the solution flowing from the bottom of the concentrator to even out the flash concentration step in a polyolefin-hydrocarbon solution. This is accomplished according to my invention by combining the recycle stream with the fresh feed stream before it enters the sprayers in the top of the concentrator and is sprayed downward through the rising vapors. This mixing substantially increases the volume of liquid being sprayed and decreases its inlet temperature as it passes into the sprays. No further heating of the recycle stream is required in order to maintain the desired rate of solvent flashing. Because of this increased volume, decreased temperature, and downward spraying through the vapors, I have found that much less violent flashing and foaming occurs which greatly decreases the amount of solution entrainment taking place, to the extent of substantially eliminating the difficulty of plugging of the heat exchangers located in the overhead vapor line.

It is an object of this invention to provide an improved method of flash concentrating a polyolefin-hydrocarbon solution.

Another object is to inhibit plugging in the solvent condensers caused by deposition of solid polymer entrained in the flashed solvent vapor.

Still another object is to reduce violent flashing and foaming in the flash concentrator.

Other objects, features and advantages of this invention will become apparent to those skilled in the art from the following description, example and drawing, in which:

The single drawing is a flow diagram depicting a flash vaporization system embodying my invention with parts in cross section.

Referring now to the drawing, a polymer solution consisting essentially of a normally solid polyolefin solute, polyethylene for example, in a hydrocarbon solvent, cyclohexane for example, coming from the concentrator feed pump (not shown) through conduit 11 is fed through preheater 12 in which it is heated to about 350° F. controlled by temperature controller 10. The preheated polymer solution passes from preheater 12 by means of conduit 13 into sprays 14, located in the top of flash chamber 16 and is sprayed downwardly against, and preferably substantially covering the surface of liquid 18 in said chamber. A pressure drop of about 5 p.s.i. normally occurs across the spray nozzles 14. In the flash space of the chamber, some solvent separation takes place and solvent vapor is taken off by conduit 17. Polymer solution collects at the bottom of flash chamber 16 as liquid 18, the level of which liquid is regulated by the liquid level controller 19, which in turn actuates valve 21 that controls polymer solution flow through conduit 13 into the sprays 14.

Examples of preferred polyolefins which may be so concentrated successfully by the present invention include polyethylene, polypropylene and polybutadiene. The solvents which are being used successfully in the present invention are hydrocarbons, and preferably paraffins including cycloparaffins. Any hydrocarbon diluent which is relatively inert, non-deleterious, and vaporizable under the flashing conditions of the process can be utilized. Hydrocarbons which are being used successfully during the concentration and separation steps according to this invention include n-butane, isobutane, n-pentane, isopentane, isooctane (2,2,4-trimethyl pentane), cyclohexane and methylcyclohexane.

Liquid 18 is withdrawn from chamber 16 through conduit 22 by means of pump 23. Part of the liquid pumped from chamber 16 is passed through line 24 to the coagulator and stripper (not shown) for water precipitation of the polymer and steam stripping of the solvent from the polymer, or such further separation of polymer from solvent as may be desired. The major portion of the liquid coming through conduit 22 is recycled through conduit 26 to conduit 13, where it is combined with polymer solution feed before being passed to chamber 16.

The rate of flow of liquid 18 out of flash chamber 16 through line 22 is controlled by constructing pump 23 to operate with a substantially constant pumping rate. The flow through line 24 is maintained at a substantially constant rate by a conventional flow controller 25, and the remainder of flow from line 22 is recycled through line 26 at a substantially constant rate. A pressure controller 30 is preferably employed in order to obviate reverse flow through line 26.

Returning to the vapor outlet conduit 17, which is provided with a pressure controller 27, which in turn actuates valve 28 that regulates solvent vapor escape from flash chamber 16, and thereby maintains a predetermined pressure in chamber 16. Normally there is a small amount of unreacted olefin in the solvent vapors in conduit 17, having originally been dissolved in the feed in conduit 11. Conduit 17 leads solvent vapor to an overhead heat exchanger 29 and from there through conduit 31 to an overhead solvent condenser 32.

If desired, in order to control the final temperature of the fluids in line 33, a temperature controller 35 may be provided as shown.

Said condensed solvent and said small amount of dissolved unreacted olefin monomer leave condenser 32 through line 33 and pass into the solvent-monomer primary separator 34 which separates these materials, the gaseous monomer being returned through line 36 for purification and further polymerization (not shown), and the hydrocarbon solvent liquid being returned through line 37 to the make-up solvent surge tank (not shown). The liquid level in separator 34 is maintained by level control 38.

The invention is operative as disclosed; however, if desired, various pumps, valves and other auxiliary equipment can be added without modifying the principle of operation of the invention. For example, if desired, any or all of the parts may be provided with suitable heat insulating material and/or steam tracing lines (not shown) to maintain them at a suitable selected minimum temperature to prevent precipitation of polymer in such instances when operating with such a high concentration of polymer solution that such precipitation would occur if the system cooled to atmospheric temperatures, particularly line 24 and the parts upstream of lines 17 and 24. For example, the lower portion of the flash concentrator may be provided with a steam jacket as steam tracing (not shown) in order to maintain the desired minimum temperature therein to prevent precipitation of polymer. Pressure and temperature indicators, safety pressure relief valves, safety shut-off switches, and valves for adding and removing cleaning solvent when it is desired to clean out the entire system (all not shown) obviously can be employed where desired in order to make the equipment easier to work with, although the present invention is unchanged thereby.

*Example*

A polymer solution, averaging 3.8 percent polyethylene, by weight, in a cyclohexane solvent was fed through the preheater at the rate of 100 g.p.m. Its condition upon leaving the preheater was about 350° F. with sufficient pressure to maintain a liquid state. This fresh feed was then combined with the recycle stream from the concentrator, which entered from the recycle conduit at a rate of about 350 g.p.m. The combined feed then entered the sprays of the flash concentrator at about 260° F., and a rate of about 450 g.p.m. Flash evaporation of solvent occurred at 37 p.s.i.a., 240° F., and a rate of 38 g.p.m. with a negligible amount of polymer solution being entrained in the solvent vapor. The concentrated solution of about 6 percent polyethylene, by weight, was pumped from the bottom of the flash concentrator at a rate of about 412 g.p.m. From this effluent, about 62 g.p.m. moved on to the polymer coagulator and steam stripper. As noted previously, the bulk of this concentrated solution was recycled at the rate of about 350 g.p.m. to the sprays of the concentrator, after first being combined with the feed stream. There were no shutdowns of the system of this invention due to plugging in the overhead exchangers, and no special cleaning of them was required over the normal cleaning of the entire polyethylene plant which occurs about once a year.

While a specific example has been given for illustrative purposes, the invention is obviously not limited thereto. For example, while in the example a feed of 3.8 percent by weight polymer concentration was concentrated to only 6 percent, the invention obviously will be applicable to a wide range of initial and final concentrations, the practical limits of which can easily be determined by tests, and which depend upon the particular polyolefin or mixture of polyolefins concerned and on the particular hydrocarbon solvent or mixture of hydrocarbon solvents selected.

I wish it to be understood that I do not desire to be limited to the exact details of construction shown and described, for obvious modifications will occur to a person skilled in the art.

I claim:

1. In a flash concentration process in which a dilute solution of a normally solid polyolefin solute dissolved in a hydrocarbon solvent at a pressure sufficient to maintain it in a liquid state is fed into a flash zone, is flashed by reducing the pressure thereon in said zone, said solution being of sufficient temperature to immediately vaporize a portion of said hydrocarbon solvent in said zone, the resulting vapor and liquid are removed separately from said zone, and said vapor is condensed to recover solvent, wherein the condensers are normally subject to rapid plugging by deposit of solute entrained in said vapor, the improvement comprising the steps of recycling a major portion of the liquid removed from said zone to feed without heating before it enters said zone, spraying these combined liquids in the top of said zone downwardly through the rising vapor against the surface of the liquid in said zone thereby substantially reducing the amount of polyolefin solute carried out of said zone with said vapor and thereby substantially increasing the time before said condensers plug.

2. The process of claim 1 in which the polyolefin is polyethylene and the hydrocarbon solvent is cyclohexane.

3. In a flash concentration process in which a dilute solution of a normally solid polyolefin solute dissolved in a hydrocarbon solvent at a pressure sufficient to maintain it in a liquid state is fed into a flash zone, is flashed by reducing the pressure thereon in said zone, said solution being of sufficient temperature to immediately vaporize a portion of said hydrocarbon solvent in said zone, the resulting vapor and liquid are removed separately from said zone, and said vapor is condensed to recover solvent, wherein the condensers are normally subject to rapid plugging by deposit of solute entrained in said vapor, the improvement comprising the steps of recycling from 70 to 90 percent of the liquid removed from said zone to said feed before it enters said zone, spraying these combined liquids in the top of said zone downwardly through the rising vapor against the surface of the liquid in said zone thereby substantially reducing the amount of polyolefin solute carried out of said zone with said vapor and thereby substantially increasing the time before said condenser plugs.

4. In a flash concentration process in which a dilute solution of a normally solid polyolefin solute dissolved in a hydrocarbon solvent at a pressure sufficient to maintain it in a liquid state is fed into a flash zone, is flashed by reducing the pressure thereon in said zone, said solution being of sufficient temperature to immediately vaporize a portion of said hydrocarbon solvent in said zone, the resulting vapor and liquid are removed separately from said zone, and said vapor is condensed to recover solvent, wherein the condensers are normally subject to rapid plugging by deposit of solute entrained in said vapor, the improvement comprising the steps of recycling a major portion of the liquid removed from said zone to said feed before it enters said zone, thereby substantially reducing the amount of polyolefin solute carried out of said zone with said vapor and thereby substantially increasing the time before said condenser plugs.

5. In a flash concentration process in which a dilute solution of a normally solid polyolefin solute dissolved in a hydrocarbon solvent at a pressure sufficient to maintain it in a liquid state is fed into a flash zone, is flashed by reducing the pressure thereon in said zone, said solution being of sufficient temperature to immediately vaporize a portion of said hydrocarbon solvent in said zone, the resulting vapor and liquid are removed separately from said zone, and said vapor is condensed to recover solvent, wherein the condensers are normally subject to rapid plugging by deposit of solute entrained in said vapor, the improvement comprising the steps of recycling from 70 to 90 percent of the liquid removed from said zone to said feed before it enters said zone, thereby substantially reducing the amount of polyolefin solute carried out of said zone with said vapor and thereby substantially increasing the time before said condenser plugs.

References Cited in the file of this patent

UNITED STATES PATENTS

| | | |
|---|---|---|
| 2,702,288 | Hoeksema et al. | Feb. 15, 1955 |
| 2,766,224 | Bannon | Oct. 9, 1956 |
| 2,825,721 | Hogan et al. | Mar. 4, 1958 |
| 2,949,447 | Hawkins et al. | Aug. 16, 1960 |